United States Patent
Iakovenko et al.

(10) Patent No.: US 12,197,855 B2
(45) Date of Patent: Jan. 14, 2025

(54) DEEP LEARNING SYSTEMS AND METHODS TO DISAMBIGUATE FALSE POSITIVES IN NATURAL LANGUAGE PROCESSING ANALYTICS

(71) Applicant: Nuix Limited, Sydney (AU)

(72) Inventors: Oleksandr Iakovenko, Odesa (UA); William Kelly, Jamaica Plain, MA (US); Stephen Land Stewart, Jenkintown, PA (US)

(73) Assignee: Nuix Limited, Sydney (AU)

(*) Notice: Subject to any disclaimer, the term of this patent is extended or adjusted under 35 U.S.C. 154(b) by 318 days.

(21) Appl. No.: 17/694,243

(22) Filed: Mar. 14, 2022

(65) Prior Publication Data
US 2023/0289522 A1   Sep. 14, 2023

(51) Int. Cl.
*G06F 40/20* (2020.01)

(52) U.S. Cl.
CPC .................. *G06F 40/20* (2020.01)

(58) Field of Classification Search
CPC .......... G06F 40/20; G06F 40/30; G06F 40/40; G06F 16/355; G06F 16/35; G06F 16/358; G06F 16/3344; G06F 18/214; G06F 16/93; G06F 18/24; G06F 18/2415; G06F 16/951; G06F 3/04817; G06F 3/04842; G06F 3/0486; G06F 16/24578; G06F 16/287; G06F 16/3322; G06F 16/334; G06F 16/353; G06F 16/685; G06F 16/9535; G06F 16/954; G06F 3/0482; G06F 40/44; G06F 7/08; G06F 16/3329; G06F 16/338; G06F 16/36; G06F 18/217; G06F 18/41; G06F 40/216; G06F 40/284
See application file for complete search history.

(56) References Cited

U.S. PATENT DOCUMENTS

| | | | | |
|---|---|---|---|---|
| 7,469,240 B2* | 12/2008 | Tsukamoto | ........... | G06F 16/353 |
| | | | | 707/E17.09 |
| 8,276,067 B2* | 9/2012 | Rujan | ............... | G06F 16/355 |
| | | | | 715/273 |
| 10,817,781 B2* | 10/2020 | Skiles | .................. | G06F 3/0486 |
| 10,963,503 B2* | 3/2021 | Skiles | .................. | G06F 16/355 |
| 11,288,297 B2* | 3/2022 | Milenova | ............... | G06F 16/35 |
| 11,521,409 B2* | 12/2022 | Tzoref-Brill | ........... | G06F 18/22 |
| 11,645,317 B2* | 5/2023 | Tolman | .................. | G06F 16/35 |
| | | | | 707/722 |
| 11,741,168 B1* | 8/2023 | Bodapati | ................. | G06F 16/35 |
| | | | | 706/12 |
| 2009/0274376 A1* | 11/2009 | Selvaraj | ................. | G06F 40/30 |
| | | | | 382/224 |

(Continued)

OTHER PUBLICATIONS

Le, Q., et al—Distributed Representations of Sentences and Documents, dated May 22, 2014, 9 pages.

(Continued)

*Primary Examiner* — Abdelali Serrou
(74) *Attorney, Agent, or Firm* — Nutter McClennen & Fish LLP

(57) ABSTRACT

Embodiments improve a document classification system by adjusting the class vector of each class based on embedded vectors of documents known to have been misclassified by the system. Embodiments methods of adjusting the class vector may be described as machine learning.

19 Claims, 7 Drawing Sheets

(56) References Cited

U.S. PATENT DOCUMENTS

| | | | |
|---|---|---|---|
| 2010/0325109 A1* | 12/2010 | Bai | G06F 16/951 |
| | | | 707/E17.089 |
| 2018/0349388 A1 | 12/2018 | Skiles et al. | |
| 2018/0357531 A1* | 12/2018 | Giridhari | G06F 18/24 |
| 2020/0012728 A1* | 1/2020 | Jan | G06F 16/36 |
| 2022/0156488 A1* | 5/2022 | Mokhtari | G06F 40/284 |
| 2023/0122684 A1* | 4/2023 | Larson | G06F 18/214 |
| | | | 382/159 |
| 2023/0401249 A1* | 12/2023 | Fan | G06F 16/355 |

OTHER PUBLICATIONS

International Search Report and Written Opinion for International Application No. PCT/US2023/015192, mailed Jun. 1, 2023 (11 pages).

* cited by examiner

DEEP LEARNING SYSTEMS AND METHODS TO DISAMBIGUATE FALSE POSITIVES IN NATURAL LANGUAGE PROCESSING ANALYTICS

TECHNICAL FIELD

The present disclosure relates to analyzing documents, and, more particularly, to categorizing documents.

BACKGROUND ART

Automatically classifying documents using natural language processing is difficult for computers, and is particularly difficult when the documents are similar to one another but belong to distinct classes. For example, while a human might be readily able to distinguish a non-disclosure agreement from a non-compete agreement, and thereby classify each document of a plurality of documents into a non-disclosure agreement class or a non-compete agreement class, accurately distinguishing a non-disclosure agreement from a non-compete agreement is difficult for conventional automated and computer-implemented methods and systems. That is because a non-disclosure agreement is very similar to a non-compete agreement in that those agreements use a substantial amount of similar or identical terminology. For example, some documents provided for classification may have 90% of their wording in common, so that definition and categorization of the documents depends on the remaining 10% of the wording of the documents.

A significant problem with conventional approaches to categorizing documents using natural language processing is lack of accuracy.

One conventional approach to automatically categorizing documents involves training a neural network to recognize and classify documents. This approach may be referred-to as a "downstream classifier model." Conventionally, such a neural network may be trained using a training set of documents, where each document has an associated document vector produced based on the wording of the document, and a document to be categorized has a corresponding document vector.

For example, one neural network may be trained to recognize non-disclosure agreements, and another neural network may be trained to recognize non-compete agreements. Ideally, each such neural network can assess a document that it had not previously assessed, and which document was not part of its training set, and determine whether that document falls within the category associated with the neural network.

Neural network approaches have one or more shortcomings, however.

One shortcoming is that trained neural networks have an unacceptably high failure rate in categorizing documents where a document is similar to more than one document type (e.g., a non-disclosure agreement is similar to a non-compete agreement, whereas a non-disclosure agreement is not as similar to a document defining terms and conditions of a commercial sales transaction; and is even less similar to a restaurant menu).

Moreover, when classification accuracy is low, it is difficult or impossible to analyze what causes the low classification accuracy and how to fix it.

Another shortcoming is that neural network-based approaches require a dedicated neural network trained to recognize each class of document. If a new class of document is presented for categorization, a corresponding neural network must be trained to assess that class of document, with significant effort, time delay, and cost. Also, when it is necessary to add a new class (or to remove an existing one) from a classification class set, there is no way other than to train another neural network, and even then it is difficult or impossible to predict the accuracy of such a new neural network, and/or the impact of such a new neural network on the accuracy of classification of pre-existing neural networks.

Another conventional approach to automatically categorizing documents is described in an article titled "Text Analysis 101: Document Classification," by Parsa Ghaffari, published by KDnuggets. That article explains that its approach to document classification "is an example of Machine Learning (ML) in the form of Natural Language Processing (NLP). By classifying text, we are aiming to assign one or more classes or categories to a document, making it easier to manage and sort." That approach suffers from lack of accuracy, however, particularly where the word vector for one class is similar a word vector defining a different class.

SUMMARY OF VARIOUS EMBODIMENTS

In accordance with an illustrative embodiment, training a natural language processing-based classification system to classify each document of a plurality of electronically-stored documents into a class selected from a plurality of classes includes: (1) providing a plurality of pre-specified class vectors, each class vector of the plurality of pre-specified class vectors associated with a corresponding class of the plurality of document classes; and (2) providing a test set including a plurality of electronically-stored documents, each document in the test set having a corresponding embedding vector, and each document in the test set having a pre-specified class assignment to a class selected from the plurality of document classes; and subsequently (3) classifying each document in the test set into a one of the classes of the plurality of classes by assigning to each such document an assigned class, the assigned class being a class having a class vector closest to the document's embedding vector; and (4) after classifying each document of the test set, identifying each document from the text set that was misclassified (each such document being a misclassified document); and (5) for each class having a misclassified document, adjusting the class vector for said class by producing a resulting vector based on the embedded vectors of the misclassified documents, and setting the class vector of the document class equal to the resulting vector to produce an updated class vector.

An illustrative embodiment includes a computer-implemented method, the method including:
  training a natural language processing-based classification system to classify each document of a plurality of electronically-stored text documents into a class selected from a plurality of document classes, by:
    providing a plurality of pre-specified class vectors, each class vector of the plurality of pre-specified class vectors uniquely associated with a corresponding document class selected from the plurality of document classes;
    providing a test set including a plurality of test documents, each test document in the test set having a corresponding embedding vector, and each test document in the test set having a pre-specified class assignment to a class selected from the plurality of document classes;

classifying each document of the plurality of test documents in the test set into a class selected from a plurality of document classes by:
  determining, for each document of the plurality of test documents in the test set, which class vector of the set of pre-specified class vectors is closest to the test document's embedding vector, and
  assigning to said test document the class corresponding to the class vector that is closest to the document's embedding vector, said class being the test document's assigned class; and subsequently
for each document class from the plurality of document classes:
  identifying a set of test documents from the test set that have been misclassified into said document class by the act of classifying, by:
  for each test document classified into said document class by the act of classifying, comparing the document's pre-specified class assignment to the test document's assigned class, and
  determining which of said test documents have an assigned class different from its pre-specified class, each document having an assigned class different from its pre-specified class being a misclassified document;
  identifying, for each misclassified document, the misclassified document's embedding vector, to produce a set (Fi) of misclassified document vectors;
  determining the mean of the vectors of the set of misclassified document vectors [mean (Fi)];
  determining an adjustment vector ($A_i$), the adjustment vector being the negative of the mean of the misclassified document vectors [$A_i=-1*\text{mean }(F_i)$];
  receiving an adjustment intensity coefficient [K], where the intensity coefficient [K] has a value between 0 and 1;
  moving the class vector of the document class with the adjustment vector to produce a resulting vector [$PR_i$], using the following equation:

$$PR_i=K*A_i+(1-K)*P_i;\text{ and}$$

setting the class vector of the document class equal to the resulting vector [$PR_i$] to produce an updated class vector.

Some embodiments further include after training the natural language processing-based classification system, using the natural language processing-based classification system to classify a set of documents, by:
  providing a set of unclassified documents to be classified, each document of the set of unclassified documents to be classified having an associated embedding vector; and
  classifying, using the classification system, each document in the set of unclassified documents into a one of the classes by assigning to each such document a final assigned class, the final assigned class being a class having an updated class vector closest to the document's embedding vector.

In some such embodiments, each document of the set of unclassified documents to be classified is not a member of the test set.

In some embodiments, the pre-specified class assignment of test documents in the test set is assigned by a human assessor.

In some embodiments, each class of the plurality of document classes has assigned to it at least one document of the plurality of test documents of the test set.

In some embodiments, determining, for each document of the plurality of test documents in the test set, which class vector of the set of pre-specified class vectors is closest to the document's embedding vector, includes:
  determining, for each class vector of the set of pre-specified class vectors, its cosine similarity to the document's embedding vector, to produce a plurality of cosine similarity values; and
  selecting, as the pre-specified class vector closest to the document's embedding vector, the pre-specified class vector having the greatest cosine similarity value from the plurality of cosine similarity values.

Another embodiment is a system for classifying documents into a plurality of pre-defined document classes, the system including:
  a computer processor coupled to a set of computer memories, the set of computer memories storing a plurality of updated class vectors, each class vector of the plurality of class vectors corresponding uniquely to a corresponding one of the document classes from the plurality of document classes, said updated class vectors generated by a process, the process including:
  providing a plurality of pre-specified class vectors, each pre-specified class vector of the plurality of pre-specified class vectors uniquely associated with a corresponding document class selected from the plurality of document classes;
  providing a test set including a plurality of test documents, each test document in the test set having a corresponding test embedding vector, and each test document in the test set having a pre-specified class assignment to a class selected from the plurality of document classes;
  determining, for each document of the plurality of test documents in the test set, which class vector of the set of pre-specified class vectors is closest to the document's embedding vector, and assigning to said document the class corresponding to the class vector that is closest to the document's embedding vector; and subsequently
  for each document class from the plurality of document classes:
  identifying a set of test documents from the test set that have been misclassified into said document class by the act of classifying, by:
  (i) for each document in said document class, comparing the document's pre-specified class assignment to the document's assigned class, and
  (ii) determining which of said documents have an assigned class different from its pre-specified class, each document having an assigned class different from its pre-specified class being a misclassified document;
  identifying, for each misclassified document, the misclassified document's embedding vector, to produce a set (E) of misclassified document vectors;
  determining the mean of the misclassified document vectors [mean ($F_i$)];
  determining an adjustment vector ($A_i$), the adjustment vector being the negative of the mean of the misclassified document vectors [$A_i=-1*\text{mean }(F_i)$];
  receiving an adjustment intensity coefficient [K], where the intensity coefficient [K] has a value between 0 and 1;
  moving the class vector of the document class with the adjustment vector to produce a resulting vector [$PR_i$], using the following equation:

$PR_i = K*A_i + (1-K)*P_i;$ and setting the class vector of the document class equal to the resulting vector [$PR_i$] to produce an updated class vector; and a classifier configured to assign, to a class from the set of classes, each document of a set of unclassified documents, said class being the final assigned class, the final assigned class being a class having updated class vector closest to the document's embedding vector.

In some embodiments, each document of the set of unclassified documents to be classified is not a member of the test set.

In some embodiments, the set of computer memories stores the set of unclassified documents to be classified into the set of document classes, each document of the set of unclassified documents having a unique corresponding embedding vector.

In some embodiments, the pre-specified class assignment of test documents in the test set is assigned by a human assessor In some embodiments, each class of the plurality of document classes has assigned to it at least one test document of the plurality of test documents of the test set.

In some embodiments, determining, for each document of the plurality of test documents in the test set, which class vector of the set of pre-specified class vectors is closest to the document's embedding vector, includes: (a) determining, for each class vector of the set of pre-specified class vectors, its cosine similarity to the document's embedding vector, to produce a plurality of cosine similarity values; and (b) selecting, as the pre-specified class vector closest to the document's embedding vector, the pre-specified class vector having the greatest cosine similarity value from the plurality of cosine similarity values.

Some embodiments further include a trainer configured to train the classifier configured to produce, for each document class, the updated class vector for said class, and replace the class vector for said class with the updated class vector.

Another embodiment is a non-transient computer readable medium storing computer-executable code for training a natural language processing-based classification system to classify each document of a plurality of electronically-stored text documents into a class selected from a plurality of classes, the computer-executable code including:

code for accessing a plurality of pre-specified class vectors, each class vector of the plurality of pre-specified class vectors associated uniquely with a corresponding document class selected from the plurality of document classes;

code for accessing a test set including a plurality of test documents, each document in the test set having a corresponding test embedding vector, and each document in the test set having a pre-specified class assignment to a class selected from the plurality of document classes;

code for classifying each document of the plurality of test documents, by:

determining, for each document of the plurality of documents in the test set, which class vector of the set of pre-specified class vectors is closest to the document's embedding vector, and assigning to said document the class corresponding to the class vector that is closest to the document's embedding vector, said class being the document's assigned class;

code for, subsequent to classifying, for each document class from the plurality of document classes:

identifying a set of test documents from the test set that have been misclassified into said document class by the act of classifying, by:

for each document in said document class, comparing the document's pre-specified class assignment to the document's assigned class, and determining which of said documents have an assigned class different from its pre-specified class, each document having an assigned class different from its pre-specified class being a misclassified document;

identifying, for each misclassified document, the misclassified document's embedding vector, to produce a set ($F_i$) of misclassified document vectors;

determining the mean of the misclassified document vectors [mean ($F_i$)];

determining an adjustment vector ($A_i$), the adjustment vector being the negative of the mean of the misclassified document vectors [$A_i = -1*$mean ($F_i$)];

receiving an adjustment intensity coefficient [K], where the intensity coefficient [K] has a value between 0 and 1;

moving the class vector of the document class with the adjustment vector to produce a resulting vector [$PR_i$], using the following equation:

$PR_i = K*A_i + (1-K)*P_i;$ and setting the class vector of the document class equal to the resulting vector [$PR_i$] to produce an updated class vector.

Some embodiments of computer readable medium further include code for providing a set of unclassified documents to be classified, each document of the set of unclassified documents to be classified having an associated embedding vector; and code for classifying, using the classification system, each document in the set of unclassified documents into a one of the classes by assigning to each such document a final assigned class, the final assigned class being a class having an updated class vector closest to the document's embedding vector.

In some embodiments, each document of the set of unclassified documents to be classified is not a member of the test set.

In some embodiments, the pre-specified class assignment of test documents in the test set was assigned by a human assessor prior to execution of the code for accessing a test set.

In some embodiments, pursuant to execution of the code for classifying each document of the plurality of test documents, each class of the plurality of document classes has assigned to it at least one document of the plurality of documents of the test set.

In some embodiments, code for determining, for each document of the plurality of documents in the test set, which class vector of the set of pre-specified class vectors is closest to the document's embedding vector, and assigning to said document the class corresponding to the class vector that is closest to the document's embedding vector, includes:

code for determining, for each class vector of the set of pre-specified class vectors, its cosine similarity to the document's embedding vector, to produce a plurality of cosine similarity values; and code for selecting, as the pre-specified class vector closest to the document's embedding vector, the pre-specified class vector having the greatest cosine similarity value from the plurality of cosine similarity values.

BRIEF DESCRIPTION OF THE DRAWINGS

The foregoing features of embodiments will be more readily understood by reference to the following detailed description, taken with reference to the accompanying drawings, in which.

DETAILED DESCRIPTION OF ILLUSTRATIVE EMBODIMENTS

Figure 1A:
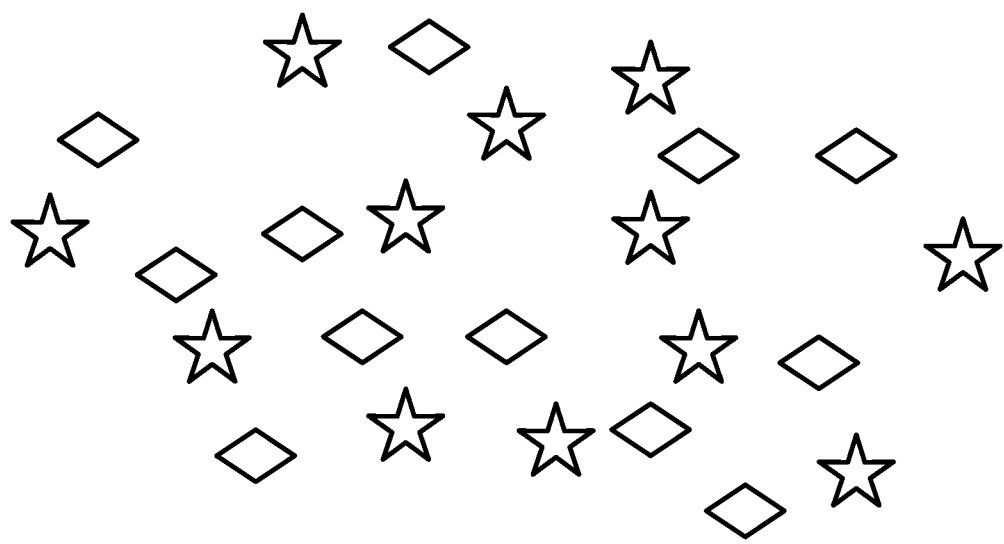
FIG. 1A schematically illustrates an embodiment of a plurality of documents to be classified into two classes.

Illustrative embodiments improve the accuracy of automated methods and systems for document classification, and methods and systems for creating computer-implemented document classification systems.

Illustrative embodiments define each class of a set of document classes with a corresponding class vector (or "center vector"). Illustrative embodiments begin with an existing class vector and test the classification process or system with a test set of training documents, each such training document having a corresponding pre-assigned classification. As described in more detail herein, such embodiments improve the corresponding method or system by analyzing misclassified documents, and revising the existing class vector to produce a revised class vector based on analysis of misclassified documents. Some embodiments produce a revised class vector by applying an adjustment vector to the class vector of the document class. A revised class vector produced as a result of the application of such a process may be referred-to as a "resulting vector."

Definitions: As used in this description and the accompanying claims, the following terms shall have the meanings indicated, unless the context otherwise requires.

A "class" means a category into which one or more documents may be classified. In illustrative embodiments, a document having an embedding vector is assigned to a given class if the document's embedding vector correlates to the class vector of the given class more closely that it correlates to the class vector of any other available class. In illustrative embodiments, each document is assigned exclusively to a single class.

A "document" for purposes of document classification includes documents having data that is in text format (i.e., a document having text data, such as a contract, book, memorandum, etc.), and in some embodiments includes documents may be documents such as images (e.g., jpeg; gif.) and/or video (e.g., mpeg).

A "set" includes at least one member.

An "embedding vector" (or "document vector") is a vector that is associated with, and describes, the content of a document. An embedding vector may be produced from the content of a text document, a musical score, and/or a digital image, to name but a few examples.

For example, an embedding vector for a given text document may be produced from an analysis of the words of the text in that given document. For example, but without limiting the generality of the definition, an embedding vector for a text document may be obtained by analyzing the document with models including "doc2vec," GloVe, and "BERT," to name but a few examples. In illustrative embodiments, the embedding vector for each document in a set of documents to be classified is the same length as the embedding vector for each other document in the set of documents to be classified. In some embodiments, the embedding vector for each document in a set of documents to be classified is a unit vector.

As other examples, an embedding vector for a given musical score may be produced from an analysis of the musical notes written in that given document, and an embedding vector for a given image document may be produced from an analysis of the pixel colors and/or pixel intensity of pixels in that image document.

A "class vector" (or "center vector") is a vector that is associated with, and uniquely describes, a class of documents. For example, the class may be a class of documents into which one or more documents may be classified. In illustrative embodiments, a document having an embedding vector is classified into a given class when the document's embedding vector is geometrically closer to the class vector for the given class than it is to the respective class vector of any other available class. In some embodiments, the closeness (or geometric proximity) of two vectors may be evaluated by determining the cosine similarity of the two vectors. In some embodiments, the class vector of a given class is the mean of the embedding vectors of all documents in that class.

A plurality of class vectors may also define a "vector space."

A "mean vector" of a plurality of documents, where each document of the plurality of documents has an associated embedding vector, is a vector having the value of the mathematical mean of each of those embedding vectors corresponding to the plurality of documents.

A "vector" is a set of a plurality of individual elements. In illustrative embodiments, a "vector" takes the form of a tuple, as known in the field of mathematics [e.g., a finite ordered list (or sequence) of elements], wherein the elements of the vector are numbers. Vectors may be subject to vector operations. One example of a vector operation is (i) Proximity between a pair of vectors. The procedure accepts a pair of vectors, and returns a number—the measure of similarity between vectors. Cosine similarity is used in illustrative embodiments. Documents that are close to each other get cosine similarity values close to 1. In contrast, a similarity of zero means that the documents are unrelated to one another (e.g., they most likely belong in different classes), and a similarity at or close to −1 denotes opposite documents. Another example of a vector operation is (ii) Finding mean vector in a set of vectors. The procedure accepts a set of vectors, and returns another vector the represents the mean of the inputs. Another example of a vector operation is (iii) Multiplying vector by a number. The procedure accepts vector, a number, and returns vector multiplied by this number. In most vector systems the procedure is performed element-wise. Another example of a vector operation is (iv) Vector addition. The procedure accepts two vectors, and returns a new vector which is a sum of the two inputs.

Illustrative embodiments provide improvements in one or more of the accuracy of document classification methods, the accuracy of a document classification system, methods of creating document classification methods (e.g., creating methods of classifying documents which methods are more accurate that conventional methods of classifying documents), and/or methods of creating or training document classification systems (e.g., creating or training systems that are more accurate that conventional systems for classifying documents). In illustrative embodiments, the accuracy of a document classification method, and the accuracy of a document classification system, may be quantified by evaluating the method or system by causing the method or system to classify a test set of documents (in which each document of the test set has a pre-assigned classification; the documents may be referred to a "test set" documents), and subsequently determining the number of documents in the test set that were correctly classified by the method or system relative to the number of documents in the test set that were incorrectly classified by the method or system.

For example, the accuracy of a system or method may be quantified as a ratio in which the numerator is the number of test set documents correctly classified and the denominator is the number of documents in the test set. Alternatively, the accuracy of a system or method may be quantified as a ratio in which the numerator is the number of test set documents incorrectly classified and the denominator is the total number of documents in the test set. Alternatively, the accuracy of a system or method may be quantified as a ratio in which the numerator is the number of test set documents correctly classified and the denominator is the total number of test set documents incorrectly classified. Alternatively, the accuracy of a system or method may be quantified as a ratio in which the numerator is the number of test set documents incorrectly classified and the denominator is the number of test set documents correctly classified.

For purposes of such accuracy quantification, a system or method is deemed to have correctly classified a document of a test set (and the document is deemed to have been correctly classified by the method or system) when the classification produced by the method or system matches that document's pre-assigned classification. A system or method is deemed to have incorrectly classified a document of the test set (and the document is deemed to have been incorrectly classified or "misclassified" by the method or system) when the classification produced by the method or system does not match that document's pre-assigned classification. A test set document's pre-assigned classification may, in illustrative embodiments, by specified (or assigned) by a human document reviewer (or human "assessor") by assessing the document and classifying the document (i.e., assigning the document's pre-assigned classification) pursuant to that assessment. In illustrative embodiments, a test set document's pre-assigned classification is specified (or assigned) before that test document is classified as part of a method of training a document classification system. Moreover, in illustrative embodiments, a test set document's pre-assigned classification is specified (or assigned) before execution of code for classifying that test document, for example as part of a test set used in training a document classification system FIG. 1A schematically illustrates an embodiment of a plurality of documents 100 to be classified into two classes. Documents of the first class are schematically illustrated as stars, and documents of the second class are schematically illustrated as diamonds.

Figure 1B:
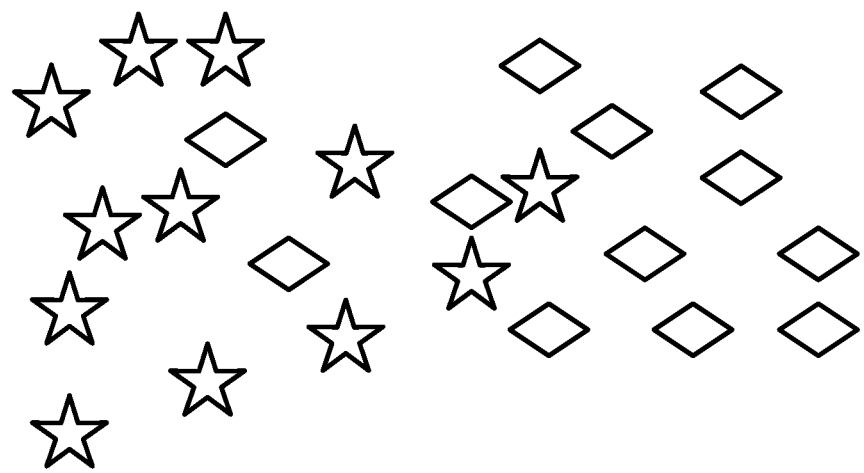
FIG. 1B schematically illustrates the plurality of documents classified into two classes pursuant to prior art methods.

The documents are displayed in a two-dimensional space. FIG. 1B schematically illustrates the plurality of documents 100 classified into the two classes pursuant to a prior art method, or by a system implementing such a prior art method. Ideally, when the documents are all correctly classified, the documents would, in this visual illustration, appear to be segregated into two distinct groups, in which no document of the first class would appear within the group of documents of the second class, and no document of the second class would appear within the group of documents of the first class. In other words, no star would be within the group of diamonds, and no diamond would be within the group of stars. As schematically illustrated in FIG. 1B, however, some stars are within the group of diamonds, and some diamond are within the group of stars. Consequently, the prior art method or system that classified the documents exhibits some inaccuracy.

Figure 1C:
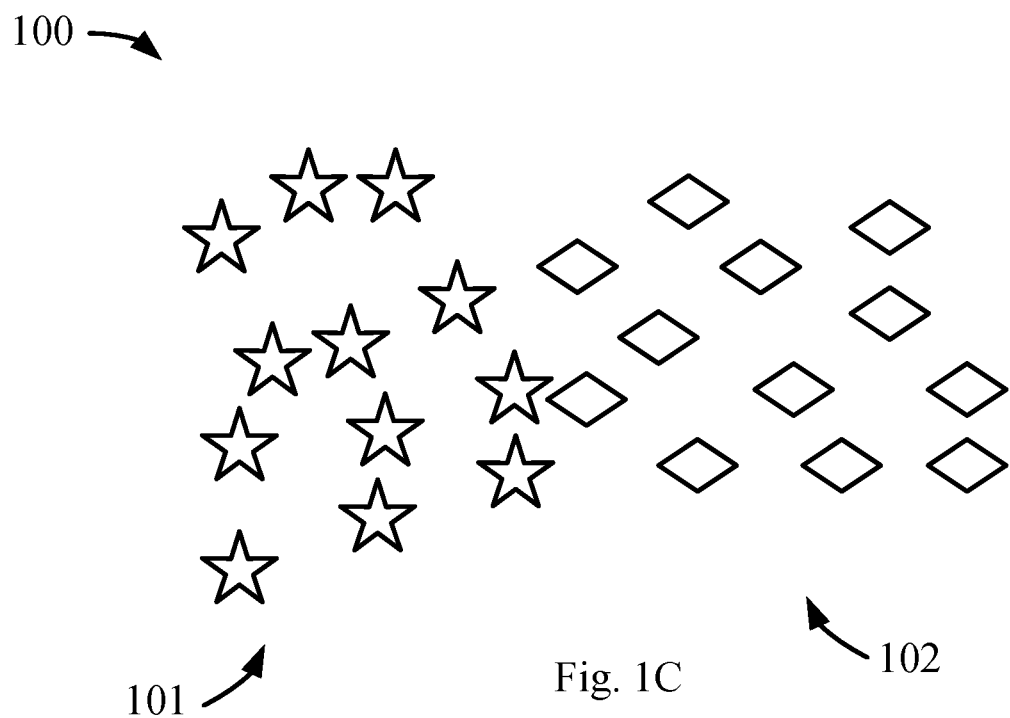
FIG. 1C schematically illustrates the plurality of documents classified into two classes pursuant to illustrative embodiments.

FIG. 1C schematically illustrates the plurality of documents 100 classified into two classes pursuant to illustrative embodiments. In contrast to FIG. 1B, in FIG. 1C, the first group 101 includes only documents of the first class (the stars) and the second group 102 includes only documents of the second class (the diamonds). The classification represented by FIG. 1C is an improvement of the accuracy of the classification represented by FIG. 1B, and the method and/or system used to produce the classification represented by FIG. 1C is (and exhibits) an improvement relative to the method and/or system used to produce the classification represented by FIG. 1B. That improvement is attributable to embodiments of methods and systems disclosed herein.

Figure 2:
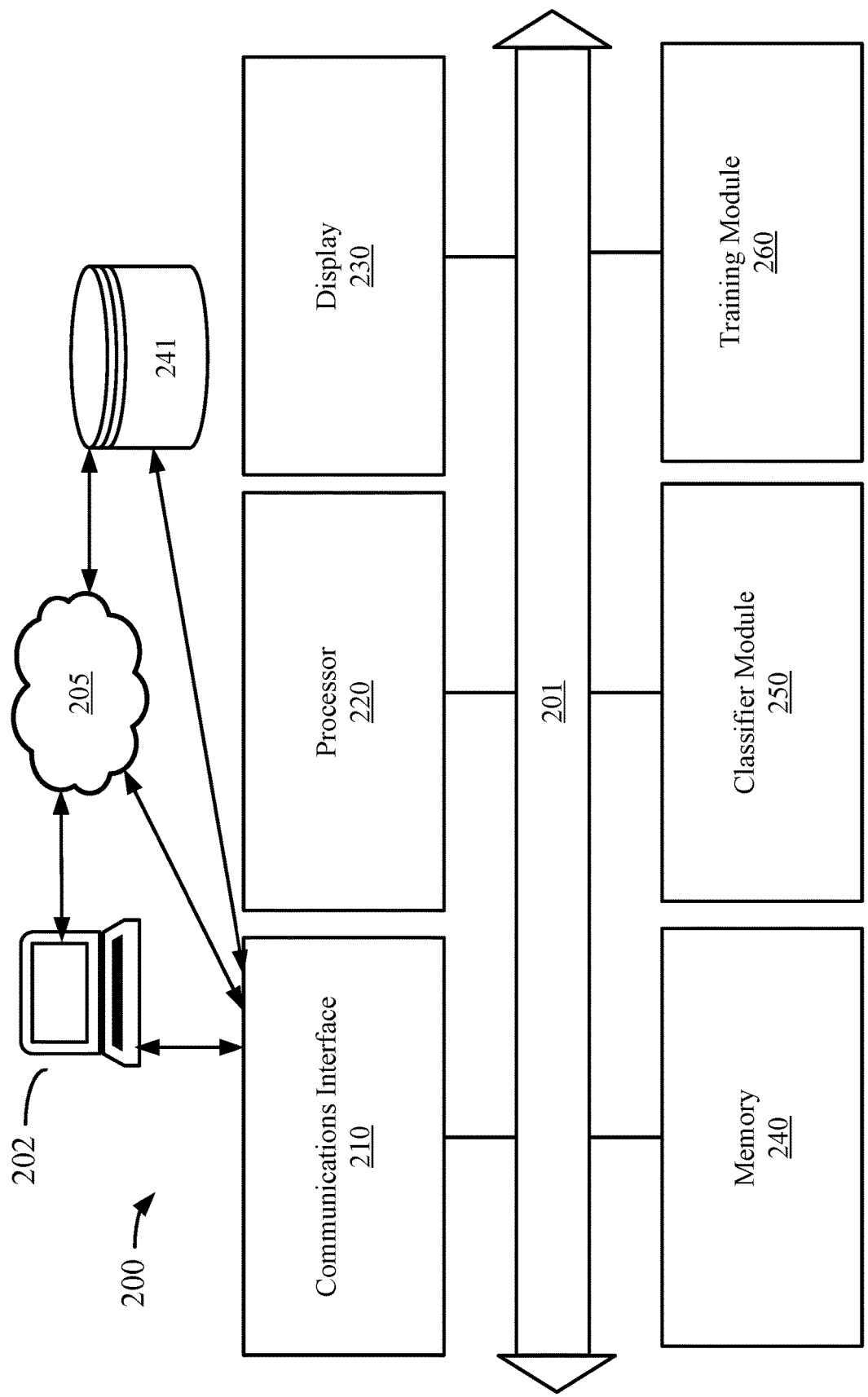
FIG. 2 schematically illustrates a system according to an illustrative embodiment.

FIG. 2 schematically illustrates a system 200 according to an illustrative embodiment. The system 200 includes a communications interface 210 configured for electronic (e.g., digital) communication with one or more other electronic devices. For example, such other devices may include another computer 202, and/or servers in the cloud and/or a remote database 241. Such communication may take place over a network 205, such as a local area network, a wide area network, or the Internet.

The system 200 also includes computer processor hardware 220, including for example a microprocessor system available from Intel or Advanced Micro Devices.

The system 200 also includes a display (e.g., a computer monitor) configured to display system output to a system user. In some embodiments, the display 230 (e.g., a touch-screen display) may also receive input from the system user.

The system 200 also includes a memory 240. The memory may be computer random access memory (RAM) and/or read-only memory (ROM), as those terms are known in the computer art. The memory 240 may be volatile or non-volatile, as those terms are known in the computer art. The memory 240 may configured to store, among other things, executable computer instructions that, when executed by the processor hardware 220, cause the system 200 to perform one or more steps of methods described herein; documents to be classified, class vectors, test sets of documents, and other information or data as described herein.

The system 200 also includes a classifier 250 configured to classify each document of a plurality of documents into a corresponding class selected from a plurality of classes. In illustrative embodiments, the classifier 250 configured to uniquely classify each document of a plurality of documents into a corresponding class selected from a plurality of classes. The classifier 250 may be configured by providing to the classifier module executable computer code configured to implement one or more steps of methods as described herein.

The system 200 also includes a trainer 260 configured to train a document classifier 260. The trainer 260 may be configured to train a classifier 250 by providing to the trainer 260 executable computer code configured to implement one or more steps of methods as described herein.

Figure 3:
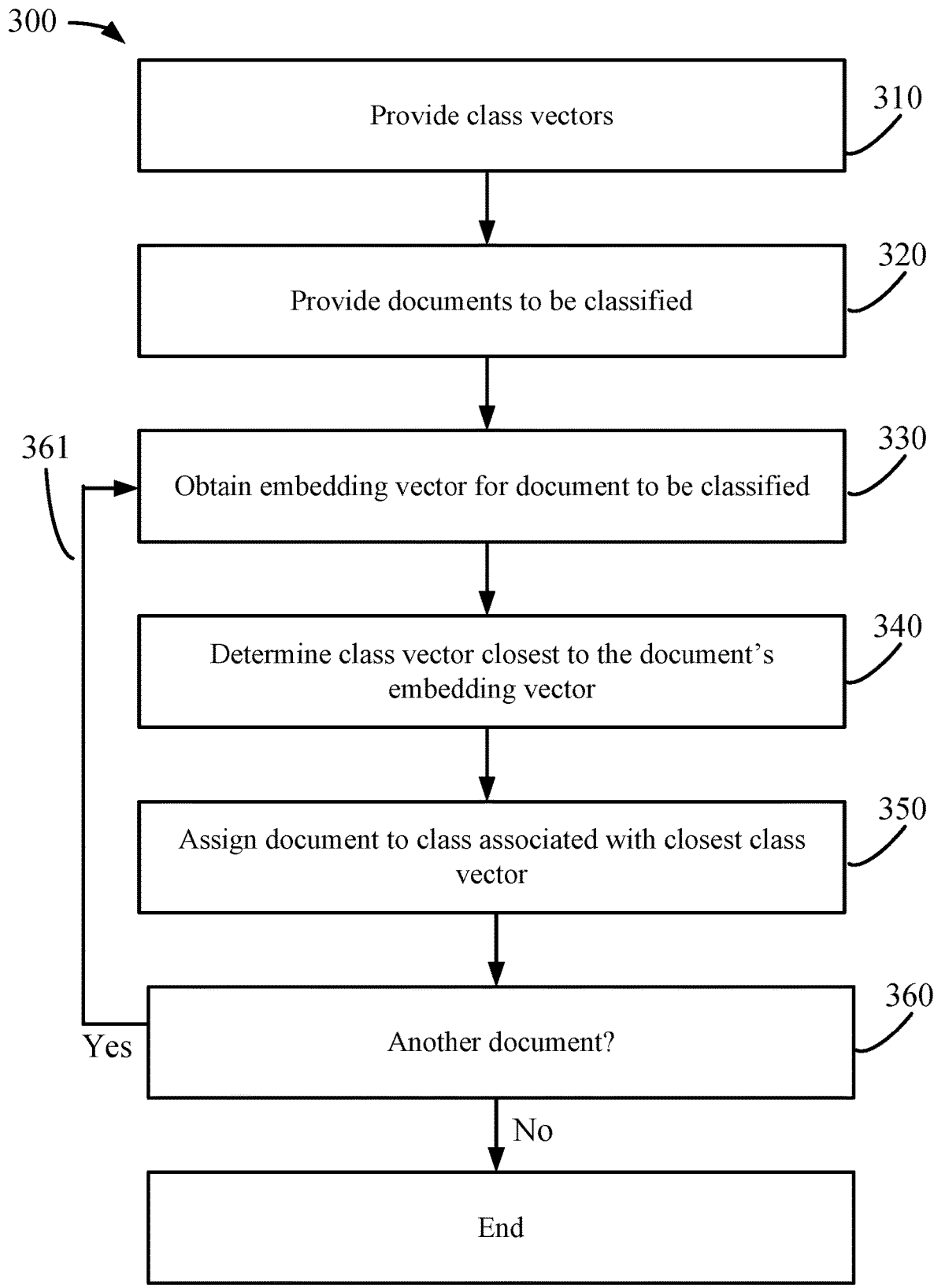
FIG. 3 is a flowchart that illustrates a method of classifying documents according to an illustrative embodiment.

FIG. 3 is a flowchart that illustrates a method 300 of classifying documents into a set of established classes according to an illustrative embodiment.

Step 310 includes providing a set of class vectors (which may be referred-to as "pre-specified" class vectors). Each class vector of the set of class vectors corresponds uniquely to a one of the classes of the set of established classes. One or more of the class vectors of the set of class vectors may be produced pursuant to an embodiment of a method described herein.

Step 320 includes providing a set of documents to be classified. Unless the documents to be classified are a test set of documents in which each document has pre-assigned classification, the documents to be classified do not have a known or pre-assigned or a priori classification.

Steps 330-350 are performed for each document in the set of documents to be classified, and may be performed repeatedly, as in a loop (e.g., step 351).

Step 330 includes obtaining, for each document to be classified, its embedding vector (which may be referred-to as its "corresponding" embedding vector). Collectively, a plurality of documents to be classified have a corresponding plurality of embedding vectors, where each embedding vector corresponds uniquely to a corresponding one of the documents in the set of documents. Such an embedding vector may be thought of as a signature of the corresponding one of the documents in the set of documents. When a document from the set of documents already has a corresponding embedding vector, obtaining an embedding vector corresponding to said document may be performed by retrieving that embedding vector, for example from a computer memory or database. If the document from the set of documents does not already have a corresponding embedding vector, obtaining an embedding vector corresponding to said document may be created by analyzing the document with models including "doc3vec," GloVe, and "BERT," to name but a few examples. In some embodiments, an embedding vector created by analyzing the document may be stored, such as in a computer memory or database, to name but a few examples.

Step 340 includes determining, for each document of the set of documents, the class vector, from the set of class vectors (see step 310), that is closest to said document's embedding vector. In illustrative embodiments, the document's embedding vector is compared to each of the class vectors by calculating the cosine similarity between the document's embedding vector and each of the class vectors. The class vector having the greatest cosine similarity to the document's embedding vector is the class vector that is closest said document's embedding vector.

In other words, determining, for each document of the set of documents, the class vector, from the set of class vectors (see step 310), that is closest said document's embedding vector includes determining, for each class vector of the set of pre-specified class vectors, its cosine similarity to the document's embedding vector, to produce a plurality of cosine similarity values; and selecting, as the pre-specified class vector closest to the document's embedding vector, the pre-specified class vector having the greatest cosine similarity value from the plurality of cosine similarity values.

Step 350 includes assigning each document of the set of documents to the class having the class vector that is closest said document's embedding vector.

Step 360 assess whether there is at least one additional document, from the set of documents, to be classified. If so ("Yes"), the method 300 loops back to step 330 at step 361. Otherwise, the method 300 terminates (ends).

Steps 330, 340 and 350 may be described, for each document of the set of documents, as determining which class vector of the set of pre-specified class vectors is closest to the document's embedding vector, and assigning to said document the class corresponding to the class vector that is closest to the document's embedding vector.

Figure 4A:
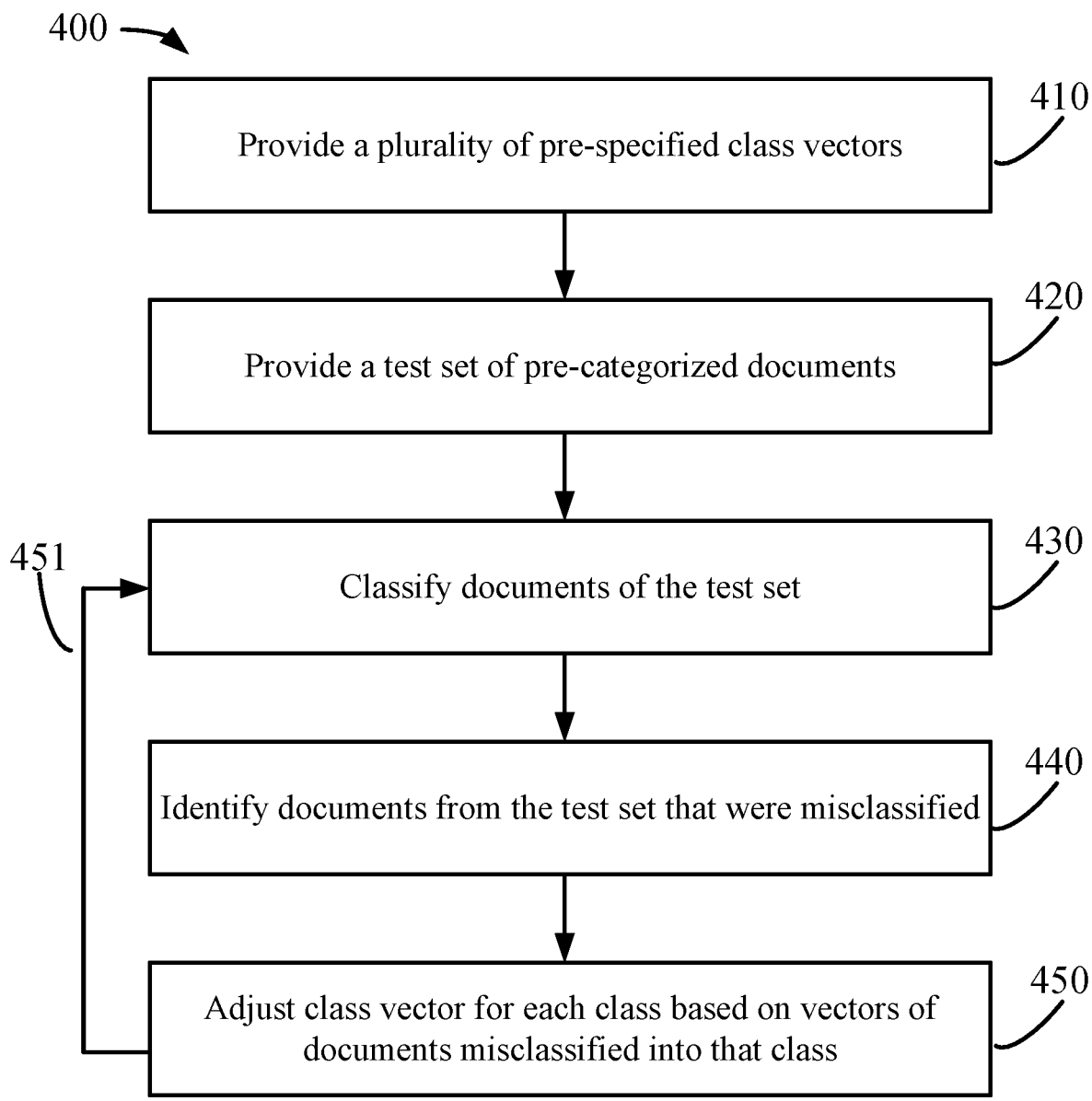
FIG. 4A is a flowchart that illustrates a method of training a document classifying system according to an illustrative embodiment.

FIG. 4A is a flowchart that illustrates a method of training a document classifying system configured to sort each document of a set of documents into a class from a set of established classes, according to an illustrative embodiment. Illustrative embodiments of a method of training a document classifying system may be described as a type of machine learning. Illustrative embodiments of a method of training a document classifying system do not train a neural network. In other words, illustrative embodiments of methods for training a natural language processing-based classification system to classify each document of a plurality of electronically-stored text documents into a class selected from a plurality of document classes include training a document classifying system do not train a neural network. In other words, illustrative embodiments of methods for training a natural language processing-based classification system to classify each document of a plurality of electronically-stored text documents into a class selected from a plurality of document classes where the natural language processing-based classification system does not classify documents using a neural network trained to classify documents.

Step 410 includes providing a set of pre-specified class vectors. Each class vector of the set of class vectors corresponds uniquely to a one of the classes of the set of established classes. For example, a set of classes may include an integer ("N") number of classes denoted with index "i" [i=1, 2, 3, . . . N], so that each class ("C") of the set of classes may be identified as "$C_i$." Each class has an associated class vector, denoted "$P_i$." Step 410 may be described as providing a plurality of pre-specified class vectors ($P_i$), in which each class vector is associated with a corresponding document class ($C_i$) selected from the plurality of document classes.

Step 420 includes providing a test set [T] of documents. The test set includes an integer number ["J"] of documents denoted with index "j" [j=1, 2, 3, . . . J]. Each document of the test set may be identified as "$d_j$." In illustrative embodiments, the test set including at least 1500 documents. For example, with a test set of 1500 test documents, the inventors improved the accuracy of an embodiment of a document classification from system from 79.8% to 84.8% over four iterations of the adjustment process described herein.

The number of documents in the test set may be determined by an operator, however, based on the operator's experience, and/or the accuracy desired for the system, and/or the nature of the documents to be classified.

Each document in the test set [T] has a pre-assigned classification selected from the N classes, which pre-assigned classification may be referred-to as its "real" class, and identified as "$r_j$." The pre-assigned classification ("$r_j$") corresponding to each document of the test set of documents may be established or determined by a human document reviewer (or human "assessor") by assessing the document and classifying the document (i.e., assigning the document's pre-assigned classification) pursuant to that assessment.

Each class ($C_i$) includes a sub-set of the documents of the test set [T], the sub-set including an integer number ("S") of documents denoted with index "s" such that each document in a subset may be identified as "$d_s$." Each document in the test set has a corresponding embedding vector $E_s$.

Each document in the test set that is pre-assigned to a class may be identified using both its class index ("i") and its document index ("s"), as "$D_{i,s}$."

For example, consider a test set [T] having nine documents, $d_1$ (having embedding vector $E_1$), $d_2$ (having embedding vector $E_2$), $d_3$ (having embedding vector $E_3$), $d_4$ (having embedding vector $E_4$), $d_5$ (having embedding vector $E_5$), $d_6$ (having embedding vector $E_6$), $d_7$ (having embedding vector $E_7$), $d_8$ (having embedding vector $E_8$), and $d_9$ (having embedding vector $E_9$). The documents of the test set fall exclusively into one of three classes (i=1, 2, and 3): $C_1$, $C_2$ and $C_3$, having class vectors $P_1$, $P_2$ and $P_3$, respectively. For example, consider that documents $d_1$, $d_4$ and $d_7$ fall into class $C_1$ (and therefore have pre-assigned classification $r_1$, and may be referred-to as documents $D_{11}$, $D_{14}$ and $D_{17}$, respectively), documents $d_2$, $d_5$ and $d_s$ fall into class $C_2$ (and therefore have pre-assigned classification $r_2$, and may be referred-to as documents $D_{22}$, $D_{25}$ and $D_{28}$, respectively), and documents $d_3$, $d_6$ and $d_9$ fall into class $C_3$ (and therefore have pre-assigned classification $r_3$, and may be referred-to as documents $D_{33}$, $D_{36}$ and $D_{39}$, respectively).

Step 430 includes automatically classifying each document of the test set of documents pursuant to its corresponding embedding vector. The class assigned to a document from the text set by such automatic classification may be referred-to as its model-defined class, and denoted "$m_i$."

In illustrative embodiments, automatically classifying each document of the test set of documents includes determining, for each document of the test set of documents, the class vector, from the set of pre-specified class vectors (see step 310), that is closest said document's embedding vector. In illustrative embodiments, the document's embedding vector is compared to each of the class vectors by calculating the cosine similarity between the document's embedding vector and each of the class vectors. The class vector having the greatest cosine similarity to the document's embedding vector is the class vector that is closest said document's embedding vector. Consequently, in some embodiments, step 430 includes automatically classifying each document in the plurality of documents of the test set into a one of the classes of the plurality of classes by assigning to each such document an assigned class, the assigned class being a class having a class vector closest to the document's embedding vector.

After step 430, each document from the test set may be referred-to as a "classified" document, and the documents of the test set of documents may be referred-to collectively as the "classified documents" or the "set of classified documents."

Step 440 includes identifying, from the set of classified documents, which of the classified documents have been misclassified. Documents have been misclassified at step 430 may be referred-to as "False Positives." Conversely documents that have been properly classified at step 430 may be referred-to as "True Positives."

The process of identifying such misclassified documents may be performed automatically, by a computer, by comparing the pre-assigned classification ("$r_j$") of each document of the test set to the class vector of the class into which it was classified at step 430. A document is misclassified if its model-defined class ("$m_i$") does not match (i.e., is not the same as) its pre-assigned classification ("$r_j$"). In other words, a document ($d_{ij}$) is misclassified (i.e., it is a False Positive) when $m_i$ is not equal to $r_i$ ($m_i \neq r_1$), and a document is correctly classified (i.e., it is a True Positive) when $m_i$ is equal to $r_i$ ($m_i = r_i$).

In an illustrative embodiment, identifying, from the set of classified documents, which of the classified documents have been misclassified, assesses each class individually. For example, identifying for each class which of its classified documents have been misclassified includes: for each document in said document class, comparing the document's pre-specified class assignment to the document's assigned class, and determining which of said documents have an automatically-assigned class different from its pre-specified class, each document having an automatically-assigned class different from its pre-specified class being a misclassified document.

In some embodiments, step 440 includes quantitatively determining the accuracy of the of classification process of step 430, in one (or more) of the ways described herein (e.g., a ratio in which the numerator is the number of test set documents correctly classified and the denominator is the number of documents in the test set; and/or as a ratio in which the numerator is the number of test set documents incorrectly classified and the denominator is the total number of documents in the test set; and/or as a ratio in which the numerator is the number of test set documents correctly classified and the denominator is the total number of test set documents incorrectly classified; and/or as a ratio in which the numerator is the number of test set documents incorrectly classified and the denominator is the number of test set documents correctly classified), to name but a few examples.

Step 450 includes adjusting the class vector for each class based on the embedding vectors of documents misclassified into that class. If a class does not have any document misclassified into that class, then the method does not adjust the class vector of that class.

Steps 430-450 of the method 400 may be performed through one or more iterations. For example, the accuracy of the of classification process of step 430 determined at step 440 may be compared to a threshold, and steps 430-450 may be repeated (step 451) until the accuracy of the of classification process of step 430 determined at step 440 meets or exceeds that threshold. The threshold may be determined by a system operator, and may depend, for example, on the needs of the system being created or tuned, and/or the nature of the documents to be classified. The inventors have discovered that an acceptable level of accuracy may be achieved within three or four iterations, although the number of iterations may depend on the desired level of accuracy, and/or the time desired to tune the method. Generally, if an acceptable level of accuracy has not been reached within 25 iterations, the iterations should be capped at 25 and other factors (e.g., the intensity coefficient; and/or the number of documents in the test set; and/or one or more of the class vectors) should be adjusted and the process repeated.

Figure 4C:
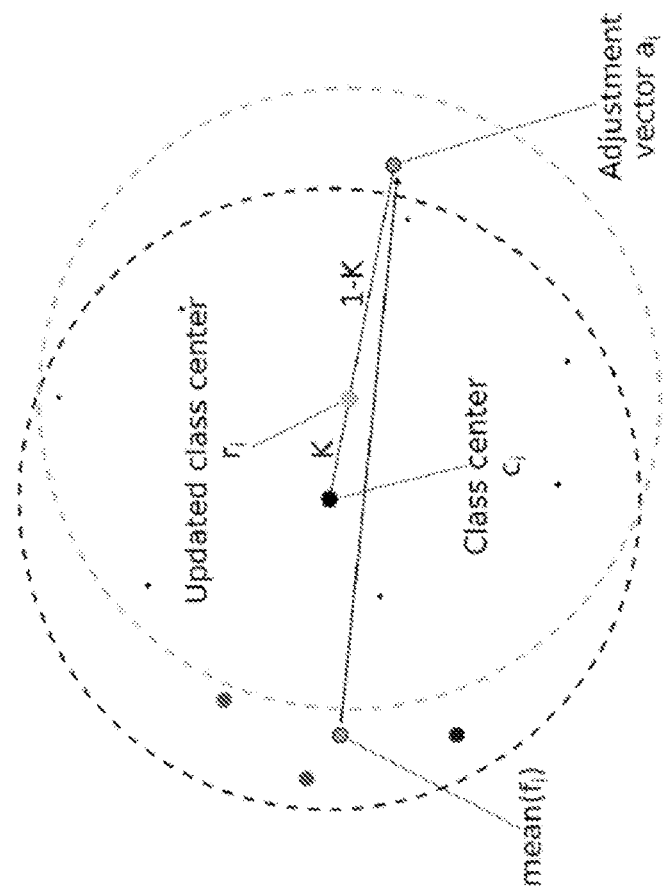
FIG. 4B and FIG. 4C schematically illustrate a class of documents before and after, respectively, adjustment of the classification system according to an embodiment.
Figure 4B:
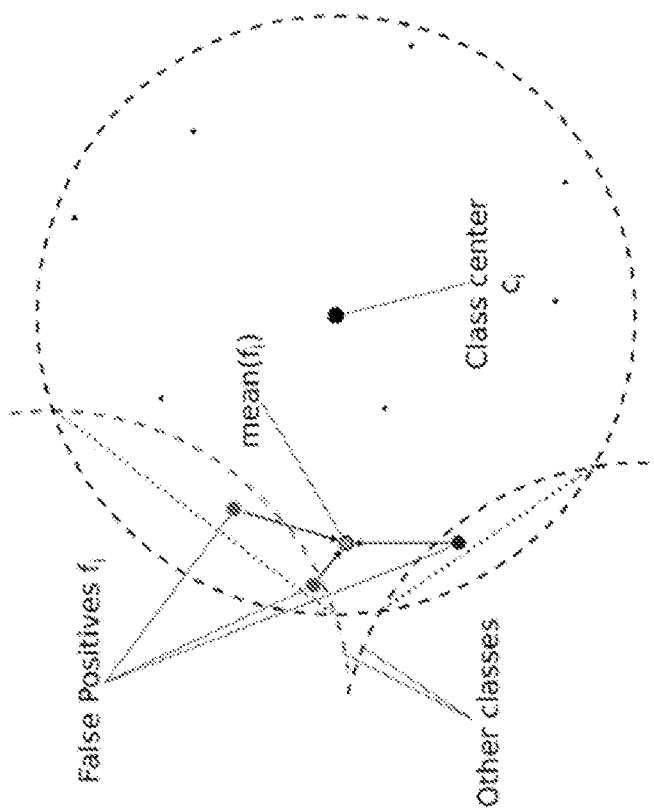

FIG. 4B and FIG. 4C schematically illustrate a class of documents before and after, respectively, adjustment of the classification system according to an embodiment. Steps 430 and 440 are represented FIG. 4B, and step 450 is represented by FIG. 4C.

Figure 5:
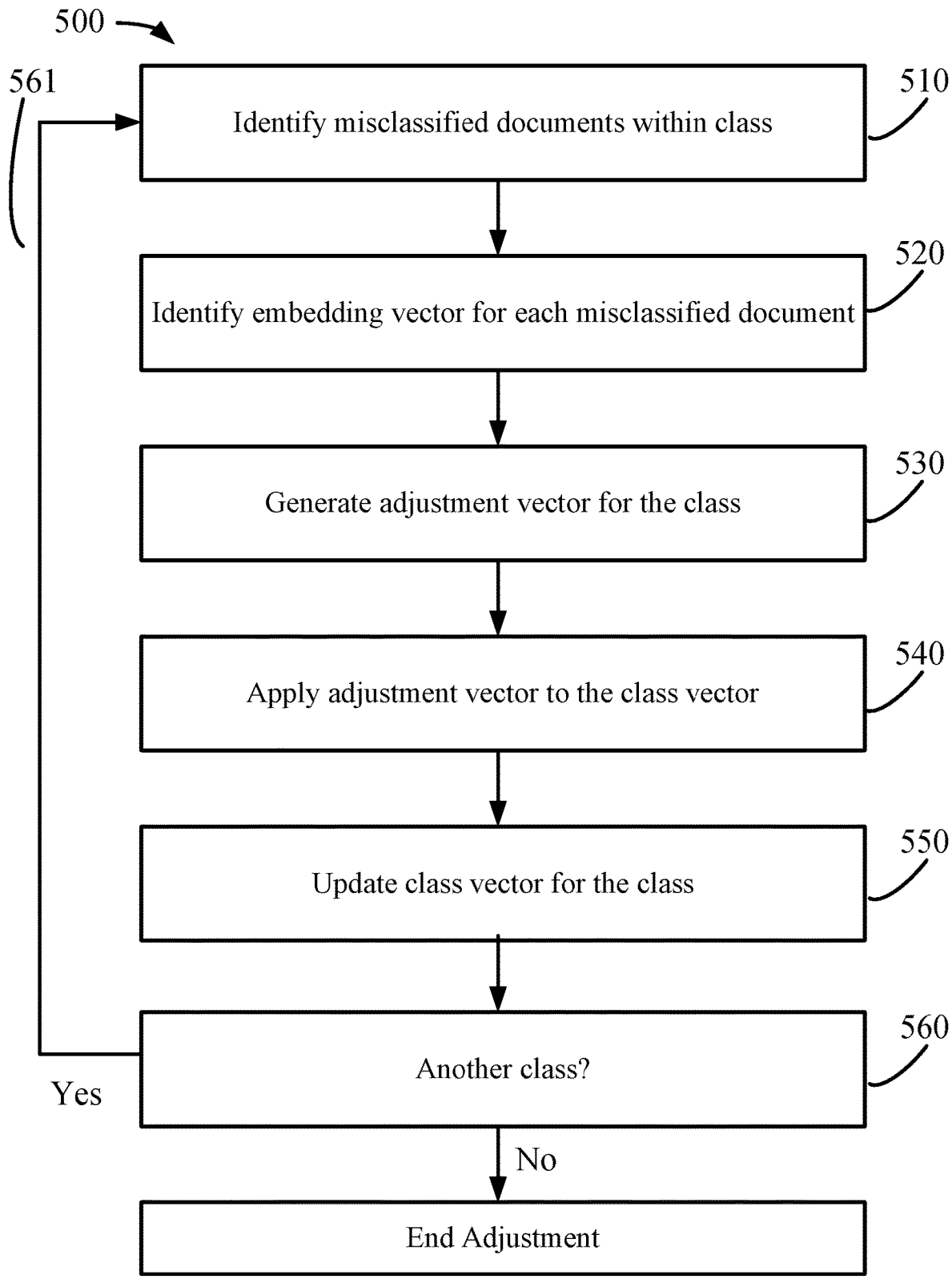
FIG. 5 is a flowchart that illustrates a method of adjusting a class vector according to an illustrative embodiment.

FIG. 5 is a flowchart that illustrates a method 500 of adjusting a class vector for a given class. This method may be performed at step 450, above.

Step 510 includes identifying misclassified documents (i.e., "False Positives") within the class.

Step 520 includes identifying, for each such misclassified document, the misclassified document's embedding vector, to produce a set ("F") of misclassified document vectors, the set including the embedding vectors, respectively, of the misclassified documents.

Step 530 includes generating an adjustment vector ($A_i$) corresponding to the class. In an illustrative embodiment, generating an adjustment vector ($A_i$) corresponding to a class ($C_i$) includes identifying the document vectors for the documents misclassified into that class (i.e., the document vectors for the False Positives within that class), which form a set ($F_i$) of misclassified document vectors, and determining the mean [mean ($F_i$)] of those document vectors in the set ("$F_i$") of misclassified document vectors, the adjustment vector ($A_i$) being the negative of the mean of the misclassified document vectors in the set ("$F_i$") [$A_i = -1*$mean ($F_i$)].

Step 540 includes applying the adjustment vector ($A_i$) to the class vector ($P_i$).

In an illustrative embodiment, applying the adjustment vector ($A_i$) to the class vector ($P_i$) includes moving the class vector ($P_i$) of the document class [$C_i$] with the adjustment vector to produce a resulting vector [$PR_i$], using the following equation:

$$PR_i = K*A_i + (1-K)*P_i;$$

where "K" is an intensity coefficient. In illustrative embodiments, K has a value between 0 and 1. In preferred embodiments, the intensity coefficient (K) is not equal to 1, since K=1 may undesirably produce a resulting vector that reduces the accuracy of the method or system. In other embodiments, the intensity coefficient (K) may selected from any of K=0.9, K=0.8, K=0.7, K=0.6, K=0.5, K=0.4, K=0.3, K=0.2, and K=0.1, to name but a few examples. The inventors have discovered that an appropriate value for the intensity factor K often lies in a range between 0.2 and 0.3. The value of K may be set and/or adjusted by a system operator, for example, based on the system operator's experience, and/or the speed (or number of iterations) desired to perform the adjustment, to name but a few examples.

Step 550 includes setting the class vector [$P_i$] of the document class [$C_i$] equal to the resulting vector [$PR_i$] to produce an updated class vector.

Some embodiments may be described with the following steps:
1. Take all document embedding vectors from the test set and for each document vector calculate proximity to all class vectors.
2. Each document is consequently assigned a model-defined class—the class with maximum proximity of the classes class vector to the document's embedding vector.
3. For each class (in turn, each class is the "current" class), the documents with model-defined class equal to real annotated class are True Positives, and the documents that have model-defined class not equal to its real class are False Positives for the class. The False Positive documents may the thought-of as documents that are mistakenly picked by an i-th class model. To counter this effect, illustrative embodiments move the class vector of that class away from the embedding vectors of the False Positive documents.
4. Find set of vectors for all False Positive documents of current class.
5. Find an adjustment vector for the current class: $A_i = -1*$mean ($F_i$)
6. Apply adjustment vector $A_i$ to current class's vector $P_i$. The resulting revised class vector ($PR_i$) is calculated as described above.
7. Update class vector for the current class: Set $P_i = PR_i$. The class vector, after having been updated in this way, may be referred-to as an updated class vector for the class.

Various embodiments may be characterized by the potential claims listed in the paragraphs following this paragraph (and before the actual claims provided at the end of this application). These potential claims form a part of the written description of this application. Accordingly, subject matter of the following potential claims may be presented as actual claims in later proceedings involving this application or any application claiming priority based on this application. Inclusion of such potential claims should not be construed to mean that the actual claims do not cover the subject matter of the potential claims. Thus, a decision to not present these potential claims in later proceedings should not be construed as a donation of the subject matter to the public.

Without limitation, potential subject matter that may be claimed (prefaced with the letter "PC" so as to avoid confusion with the actual claims presented below) includes:

PC1. A computer-implemented method comprising: training a natural language processing-based classification system to classify each document of a plurality of electronically-stored documents into a class selected from a plurality of classes [$C_i$, i=1, 2 . . . N], by: providing a plurality of pre-specified class vectors [$P_i$, i=1, 2 . . . N], each class vector of the plurality of pre-specified class vectors associated with a corresponding class of the plurality of document classes [$C_i$, i=1, 2 . . . N]; providing a test set [Ti, j=1, 2 . . . M] comprising a plurality of electronically-stored documents, each document in the test set having a corresponding embedding vector, and each document in the test set having a pre-specified class assignment to a class selected from the plurality of document classes; classifying each document in the test set into a one of the classes of the plurality of classes by assigning to each such document an assigned class, the assigned class being a class having a class vector ($P_i$) closest to the document's embedding vector; after classifying each document of the test set, identifying each document from the text set that was misclassified (each such document being a misclassified document); and for each class having a misclassified document, adjusting the class vector for said class by producing a resulting vector [$PR_i$] based on the embedded vectors of the misclassified documents, and setting the class vector [$P_i$] of the document class [$C_1$] equal to the resulting vector [$PR_i$] to produce an updated class vector.

PC11. A computer-implemented method comprising of training a natural language processing-based classification system to classify each document of a plurality of electronically-stored documents into a document class selected from a plurality of document classes, the method comprising:

providing a natural language processing-based classification system;

classifying, by the natural language processing-based classification system, each document of a set of test documents using the classification system, each of said documents being a classified test document and having an assigned class;

identifying test documents, from among the classified test documents, that have been misclassified; and adjusting the natural language processing-based classification system based on analysis of embedding vectors of the misclassified test documents to improve the accuracy of the natural language processing-based classification system.

PC12: The method of PC11, wherein each test document has a pre-assigned classification.

PC13: The method of any pf PC11-PC12, wherein each test document has a pre-assigned classification, which pre-assigned classification is assigned by a human assessor.

PC14: The method of any of PC11-PC13, wherein each test document has a pre-assigned classification, and wherein identifying test documents, from among the classified test documents, that have been misclassified comprises comparing, for each classified test document, its pre-assigned classification to its assigned class, a misclassified test document being a classified test document for which its pre-assigned classification does not match its assigned class.

PC15: The method of any of PC11-PC14, wherein providing a natural language processing-based classification system comprises providing a plurality of pre-specified class vectors, each class vector of the plurality of pre-specified class vectors associated with a corresponding document class selected from the plurality of document classes.

PC17: The method of any of PC11-PC16, wherein classifying, by the natural language processing-based classification system, each document of a set of test documents using the classification system comprises: determining, for each document of the plurality of test documents, which class vector of the set of pre-specified class vectors is closest to the document's embedding vector, and assigning to said document the class corresponding to the class vector that is closest to the document's embedding vector.

PC18: The method of any of PC11-PC17, wherein adjusting the natural language processing-based classification system based on analysis of embedding vectors of the misclassified test documents to improve the accuracy of the natural language processing-based classification system comprises:
identifying, for each misclassified document, the misclassified document's embedding vector, to produce a set of misclassified document vectors $(F_i)$;
determining the mean of the misclassified document vectors [mean $(F_i)$];
determining an adjustment vector $(A_i)$, the adjustment vector being the negative of the mean of the misclassified document vectors $[A_i=-1*\text{mean } (F_i)]$;
receiving an adjustment intensity coefficient [K], where the intensity coefficient [K] has a value between 0 and 1;
moving the class vector $[P_i]$ of the document class $[C_i]$ with the adjustment vector to produce a resulting vector $[PR_i]$, using the following equation:

$PR_i=K*A_i+(1-K)*P_i$; and setting the class vector $[P_i]$ of the document class $[C_i]$ equal to the resulting vector $[PR_i]$ to produce an updated class vector $[Z_i]$.

PC31. A computer-implemented method comprising:
training a natural language processing-based classification system to classify each document of a plurality of electronically-stored text documents into a class selected from a plurality of classes $[C_i, i=1, 2 \ldots N]$, by:
providing a plurality of pre-specified class vectors $[P_i, i=1, 2 \ldots N]$, each class vector of the plurality of pre-specified class vectors associated with a corresponding document class selected from the plurality of document classes $[C_i, i=1, 2 \ldots N]$;
providing a test set $[T_j, j=1, 2 \ldots M]$ comprising a plurality of documents, each document in the test set having a corresponding embedding vector $(E_j)$, and each document in the test set having a pre-specified class assignment to a class selected from the plurality of document classes;
determining, for each document of the plurality of documents in the test set, which class vector of the set of pre-specified class vectors is closest to the document's embedding vector, and assigning to said document the class corresponding to the class vector that is closest to the document's embedding vector; and subsequently
for each document class $[C_i]$ from the plurality of document classes:
identifying a set of documents from the test set that have been misclassified into said document class by the act of classifying, by:
for each document in said document class, comparing the document's pre-specified class assignment to the document's assigned class, and
determining which of said documents have an assigned class different from its pre-specified class, each document having an assigned class different from its pre-specified class being a misclassified document;
identifying, for each misclassified document, the misclassified document's embedding vector, to produce a set of misclassified document vectors $(F_i)$;
determining the mean of the misclassified document vectors [mean $(F_i)$];
determining an adjustment vector $(A_i)$, the adjustment vector being the negative of the mean of the misclassified document vectors $[A_i=-1*\text{mean } (F_i)]$;
receiving an adjustment intensity coefficient [K], where the intensity coefficient [K] has a value between 0 and 1;
moving the class vector $[P_i]$ of the document class $[C_i]$ with the adjustment vector to produce a resulting vector $[PR_i]$, using the following equation:

$PR_i=K*A_i+(1-K)*P_i$; and setting the class vector $[P_i]$ of the document class $[C_i]$ equal to the resulting vector $[PR_i]$ to produce an updated class vector.

PC32. The method of claim PC31, further comprising, after training the natural language processing-based classification system, using the natural language processing-based classification system to classify a set of documents, by:
providing a set of documents to be classified, and each document of the set of documents to be classified having an associated embedding vector; and
classifying, using the classification system, each document in the set of unclassified documents into a one of the classes by assigning to each such document an assigned class, the assigned class being a class having an updated class vector (Z) closest to the document's embedding vector.

PC33. The method of any of PC31-PC32, wherein each document of the set of documents to be classified is not a member of the test set.

PC34. The method of any of PC31-PC33, where the pre-specified class assignment of documents in the test set is assigned by a human assessor.

PC35. The method of any of PC31-PC34, wherein each class of the plurality of document classes has assigned to it at least one document of the plurality of documents of the test set.

PC36. The method of any of PC31-PC35, wherein determining, for each document of the plurality of documents in the test set, which class vector of the set of pre-specified class vectors is closest to the document's embedding vector comprises:

determining, for each class vector of the set of pre-specified class vectors, its cosine similarity to the document's embedding vector, to produce a plurality of cosine similarity values; and selecting, as the pre-specified class vector closest to the document's embedding vector, the pre-specified class vector having the greatest cosine similarity value from the plurality of cosine similarity values.

PC41: A computer-implemented method of improving a natural language processing-based classification system to classify each document of a plurality of electronically-stored text documents into a class selected from a plurality of document classes, the method comprising:

providing the natural language processing-based classification system previously configured to classify each document of a plurality of electronically-stored documents into a class selected from a plurality of document classes;

providing a test set comprising a plurality of test documents;

classifying each of the test documents using the natural language processing-based classification system, each such test document consequently being a classified test document;

identifying misclassified test documents;

analyzing the misclassified test documents to produce an analysis of the misclassified test documents; and adjusting the natural language processing-based classification system based on the analysis of the misclassified test documents.

PC42: The method of PC41, further comprising: providing a plurality of pre-specified class vectors, each class vector of the plurality of pre-specified class vectors uniquely associated with a corresponding document class selected from the plurality of document classes.

PC43: The method of any of PC41-PC42, wherein each test document in the test set has a corresponding embedding vector, and each test document in the test set has a pre-specified class assignment to a class selected from the plurality of document classes.

PC44: The method of PC43, wherein identifying misclassified test documents comprises identifying, in each class, test documents having a pre-specified class assignment to a different class, each such test document being a misclassified test document.

PC45: The method of any of PC41-PC44, further comprising providing a plurality of pre-specified class vectors, each class vector of the plurality of pre-specified class vectors uniquely associated with a corresponding document class selected from the plurality of document classes.

PC46: The method of PC45, wherein classifying each of the test documents using the natural language processing-based classification system comprises:

determining, for each test document of the plurality of test documents in the test set, which class vector of the set of pre-specified class vectors is closest to the test document's embedding vector, and assigning to said test document the class corresponding to the class vector that is closest to the document's embedding vector, said class being the test document's assigned class.

PC46: The method of PC45 wherein determining, for each document of the plurality of test documents in the test set, which class vector of the set of pre-specified class vectors is closest to the document's embedding vector comprises:

determining, for each class vector of the set of pre-specified class vectors, its cosine similarity to the document's embedding vector, to produce a plurality of cosine similarity values; and selecting, as the pre-specified class vector closest to the document's embedding vector, the pre-specified class vector having the greatest cosine similarity value from the plurality of cosine similarity values.

PC47: The method of any of PC41-PC46, wherein the natural language processing-based classification system is not a neural network-based classification system.

PC48: The method of any of PC41-PC47, wherein document classification functionality of the natural language processing-based classification system is not implemented using a neural network.

Various embodiments of this disclosure may be implemented at least in part in any conventional computer programming language. For example, some embodiments may be implemented in a procedural programming language (e.g., "C"), or in an object-oriented programming language (e.g., "C++"), or in Python, R, Java, LISP or Prolog. Other embodiments of this disclosure may be implemented as preprogrammed hardware elements (e.g., application specific integrated circuits, FPGAs, and digital signal processors), or other related components.

In an alternative embodiment, the disclosed apparatus and methods may be implemented as a computer program product for use with a computer system. Such implementation may include a series of computer instructions fixed either on a tangible medium, such as a non-transient computer readable medium (e.g., a diskette, CD-ROM, ROM, FLASH memory, or fixed disk). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of this disclosure may be implemented as a combination of both software (e.g., a computer program product) and hardware. Still other embodiments of this disclosure are implemented as entirely hardware, or entirely software.

Computer program logic implementing all or part of the functionality previously described herein may be executed at different times on a single processor (e.g., concurrently) or may be executed at the same or different times on multiple processors and may run under a single operating system process/thread or under different operating system processes/threads. Thus, the term "computer process" refers generally to the execution of a set of computer program instructions regardless of whether different computer processes are executed on the same or different processors and regardless of whether different computer processes run under the same operating system process/thread or different operating system processes/threads.

The embodiments described above are intended to be merely exemplary; numerous variations and modifications will be apparent to those skilled in the art. All such variations and modifications are intended to be within the scope of the present disclosure as defined in any appended claims.

What is claimed is:

1. A computer-implemented method comprising:
training a natural language processing-based classification system to classify each document of a plurality of electronically-stored text documents into a class selected from a plurality of document classes, by:
providing a plurality of pre-specified class vectors, each class vector of the plurality of pre-specified class vectors uniquely associated with a corresponding document class selected from the plurality of document classes;
providing a test set comprising a plurality of test documents, each test document in the test set having a corresponding embedding vector, and each test document in the test set having a pre-specified class assignment to a class selected from the plurality of document classes;
classifying each document of the plurality of test documents in the test set into a class selected from a plurality of document classes by:
determining, for each document of the plurality of test documents in the test set, which class vector of the set of pre-specified class vectors is closest to the test document's embedding vector, and
assigning to said test document the class corresponding to the class vector that is closest to the document's embedding vector, said class being the test document's assigned class; and subsequently
for each document class from the plurality of document classes:
identifying a set of test documents from the test set that have been misclassified into said document class by the act of classifying, by:
for each test document classified into said document class by the act of classifying, comparing the document's pre-specified class assignment to the test document's assigned class, and
determining which of said test documents have an assigned class different from its pre-specified class, each document having an assigned class different from its pre-specified class being a misclassified document;
identifying, for each misclassified document, the misclassified document's embedding vector, to produce a set (Fi) of misclassified document vectors;
determining the mean of the vectors of the set of misclassified document vectors [mean (Fi)];
determining an adjustment vector ($A_i$), the adjustment vector being the negative of the mean of the misclassified document vectors [$A_i=-1*\text{mean}(F_i)$];
receiving an adjustment intensity coefficient [K], where the intensity coefficient [K] has a value between 0 and 1;
moving the class vector of the document class with the adjustment vector to produce a resulting vector [$PR_i$], using the following equation:

$$PR_i = K*A_i + (1-K)*P_i;\text{ and}$$

setting the class vector of the document class equal to the resulting vector [$PR_i$] to produce an updated class vector.

2. The method of claim 1, further comprising, after training the natural language processing-based classification system, using the natural language processing-based classification system to classify a set of documents, by:
providing a set of unclassified documents to be classified, each document of the set of unclassified documents to be classified having an associated embedding vector; and
classifying, using the classification system, each document in the set of unclassified documents into a one of the classes by assigning to each such document a final assigned class, the final assigned class being a class having an updated class vector closest to the document's embedding vector.

3. The method of claim 2, wherein each document of the set of unclassified documents to be classified is not a member of the test set.

4. The method of claim 1, wherein the pre-specified class assignment of test documents in the test set is assigned by a human assessor.

5. The method of claim 1, wherein each class of the plurality of document classes has assigned to it at least one document of the plurality of test documents of the test set.

6. The method of claim 1, wherein determining, for each document of the plurality of test documents in the test set, which class vector of the set of pre-specified class vectors is closest to the document's embedding vector comprises:
determining, for each class vector of the set of pre-specified class vectors, its cosine similarity to the document's embedding vector, to produce a plurality of cosine similarity values; and
selecting, as the pre-specified class vector closest to the document's embedding vector, the pre-specified class vector having the greatest cosine similarity value from the plurality of cosine similarity values.

7. A system for classifying documents into a plurality of pre-defined document classes, the system comprising:
a computer processor coupled to a set of computer memories, the set of computer memories storing a plurality of updated class vectors, each class vector of the plurality of class vectors corresponding uniquely to a corresponding one of the document classes from the plurality of document classes, said updated class vectors generated by a process comprising:
providing a plurality of pre-specified class vectors, each pre-specified class vector of the plurality of pre-specified class vectors uniquely associated with a corresponding document class selected from the plurality of document classes;
providing a test set comprising a plurality of test documents, each test document in the test set having a corresponding k embedding vector, and each test document in the test set having a pre-specified class assignment to a class selected from the plurality of document classes;

determining, for each document of the plurality of test documents in the test set, which class vector of the set of pre-specified class vectors is closest to the document's embedding vector, and assigning to said document the class corresponding to the class vector that is closest to the document's embedding vector; and subsequently for each document class from the plurality of document classes:
identifying a set of test documents from the test set that have been misclassified into said document class by the act of classifying, by:
(i) for each document in said document class, comparing the document's pre-specified class assignment to the document's assigned class, and
(ii) determining which of said documents have an assigned class different from its pre-specified class, each document having an assigned class different from its pre-specified class being a misclassified document;
identifying, for each misclassified document, the misclassified document's embedding vector, to produce a set ($F_i$) of misclassified document vectors;
determining the mean of the misclassified document vectors [mean ($F_i$)];
determining an adjustment vector ($A_i$), the adjustment vector being the negative of the mean of the misclassified document vectors [$A_i = -1*$mean ($F_i$)];
receiving an adjustment intensity coefficient [K], where the intensity coefficient [K] has a value between 0 and 1;
moving the class vector of the document class with the adjustment vector to produce a resulting vector [$PR_i$], using the following equation:

$$PR_i = K*A_i + (1-K)*P_i;$$ and setting the class vector of the document class equal to the resulting vector [$PR_i$] to produce an updated class vector; and
a classifier configured to assign, to a class from the set of classes, each document of a set of unclassified documents, said class being the final assigned class, the final assigned class being a class having updated class vector closest to the document's embedding vector.

8. The system of claim 7, wherein each document of the set of unclassified documents to be classified is not a member of the test set.

9. The system of claim 7, wherein the set of computer memories stores the set of unclassified documents to be classified into the set of document classes, each document of the set of unclassified documents having a unique corresponding embedding vector.

10. The system of claim 7, wherein the pre-specified class assignment of test documents in the test set is assigned by a human assessor.

11. The system of claim 7, wherein each class of the plurality of document classes has assigned to it at least one test document of the plurality of test documents of the test set.

12. The system of claim 7, wherein determining, for each document of the plurality of test documents in the test set, which class vector of the set of pre-specified class vectors is closest to the document's embedding vector, comprises:
(a) determining, for each class vector of the set of pre-specified class vectors, its cosine similarity to the document's embedding vector, to produce a plurality of cosine similarity values; and
(b) selecting, as the pre-specified class vector closest to the document's embedding vector, the pre-specified class vector having the greatest cosine similarity value from the plurality of cosine similarity values.

13. The system of claim 7, further comprising a trainer configured to train the classifier configured to produce, for each document class, the updated class vector for said class, and replace the class vector for said class with the updated class vector.

14. A non-transitory computer readable medium storing computer-executable code for training a natural language processing-based classification system to classify each document of a plurality of electronically-stored text documents into a class selected from a plurality of classes, the computer-executable code comprising:
code for accessing a plurality of pre-specified class vectors, each class vector of the plurality of pre-specified class vectors associated uniquely with a corresponding document class selected from the plurality of document classes;
code for accessing a test set comprising a plurality of test documents, each document in the test set having a corresponding test embedding vector, and each document in the test set having a pre-specified class assignment to a class selected from the plurality of document classes;
code for classifying each document of the plurality of test documents, by:
determining, for each document of the plurality of documents in the test set, which class vector of the set of pre-specified class vectors is closest to the document's embedding vector, and
assigning to said document the class corresponding to the class vector that is closest to the document's embedding vector, said class being the document's assigned class;
code for, subsequent to classifying, for each document class from the plurality of document classes:
identifying a set of test documents from the test set that have been misclassified into said document class by the act of classifying, by:
for each document in said document class, comparing the document's pre-specified class assignment to the document's assigned class, and
determining which of said documents have an assigned class different from its pre-specified class, each document having an assigned class different from its pre-specified class being a misclassified document;
identifying, for each misclassified document, the misclassified document's embedding vector, to produce a set ($F_i$) of misclassified document vectors;
determining the mean of the misclassified document vectors [mean ($F_i$)];
determining an adjustment vector ($A_i$), the adjustment vector being the negative of the mean of the misclassified document vectors [$A_i = -1*$mean ($F_i$)];
receiving an adjustment intensity coefficient [K], where the intensity coefficient [K] has a value between 0 and 1;

moving the class vector of the document class with the adjustment vector to produce a resulting vector [$PR_i$], using the following equation:

$PR_i = K*A_i + (1-K)*P_i;$ and setting the class vector of the document class equal to the resulting vector [$PR_i$] to produce an updated class vector.

15. The computer readable medium of claim 14 further comprising:
   code for providing a set of unclassified documents to be classified, each document of the set of unclassified documents to be classified having an associated embedding vector; and
   code for classifying, using the classification system, each document in the set of unclassified documents into a one of the classes by assigning to each such document a final assigned class, the final assigned class being a class having an updated class vector closest to the document's embedding vector.

16. The computer readable medium of claim 15, wherein each document of the set of unclassified documents to be classified is not a member of the test set.

17. The computer readable medium of claim 14, wherein the pre-specified class assignment of test documents in the test set was assigned by a human assessor prior to execution of the code for accessing a test set.

18. The computer readable medium of claim 14 wherein pursuant to execution of the code for classifying each document of the plurality of test documents, each class of the plurality of document classes has assigned to it at least one document of the plurality of documents of the test set.

19. The computer readable medium of claim 14 wherein code for determining, for each document of the plurality of documents in the test set, which class vector of the set of pre-specified class vectors is closest to the document's embedding vector, and assigning to said document the class corresponding to the class vector that is closest to the document's embedding vector, comprises:
   code for determining, for each class vector of the set of pre-specified class vectors, its cosine similarity to the document's embedding vector, to produce a plurality of cosine similarity values; and
   code for selecting, as the pre-specified class vector closest to the document's embedding vector, the pre-specified class vector having the greatest cosine similarity value from the plurality of cosine similarity values.

* * * * *